United States Patent
Jones

Patent Number: 5,811,656
Date of Patent: Sep. 22, 1998

[54] SIMPLIFIED INERTIAL BANK ANGLE SENSOR

[76] Inventor: Jerry Jones, 341 Jean St., Mill Valley, Calif. 94941

[21] Appl. No.: 781,295

[22] Filed: Jan. 13, 1997

Related U.S. Application Data

[63] Continuation-in-part of Ser. No. 433,796, Apr. 27, 1995, Pat. No. 5,684,244, which is a continuation-in-part of Ser. No. 29,767, Mar. 11, 1993, Pat. No. 5,426,571.

[51] Int. Cl.$^6$ ............................................. B62J 6/00
[52] U.S. Cl. ................................. 73/1.75; 362/71; 362/72
[58] Field of Search ........................... 73/1 E, 1 D, 1.75; 33/335, 343, 350, 366, 368, 399, 401, 328, 329; 362/71, 72, 385, 386

[56] References Cited

U.S. PATENT DOCUMENTS

| | | |
|---|---|---|
| 2,407,580 | 9/1946 | Scott . |
| 4,606,133 | 8/1986 | Mills . |
| 4,868,720 | 9/1989 | Miyauchi et al. . |
| 4,870,545 | 9/1989 | Hatanaka et al. . |

FOREIGN PATENT DOCUMENTS 0268211  11/1990  Japan .

Primary Examiner—Robert Raevis

[57] ABSTRACT

In order to determine the direction and degree of bank of a motorcycle, a flywheel or other weight balanced at its center of mass is mounted on the motorcycle so that it is free to rotate about an axis parallel to the longitudinal axis of the motorcycle.

As the vehicle banks, the flywheel will tend to maintain its position, and the angle of bank can be ascertained by measuring the direction and degree of rotation between the plane of the motorcycle and the flywheel. Measurement of flywheel rotation is obtained by means of an electromagnetic or electro-optical scanner. This device may be used to control headlight beam rotation about the beam axis, thereby keeping the horizontal cutoff of the rectangular beam cross-section parallel to the horizon at all times.

Because of friction and vibration, however, the flywheel position may drift relative to the horizon, rendering the angle measurement inaccurate. Therefore it is necessary for the operator to correct for flywheel drift periodically by stopping flywheel rotation when the vehicle is upright or normal to the road surface. This driver input also resets the headlight beam to its normal position. For daytime use, the headlight beam may be locked in its normal position.

18 Claims, 4 Drawing Sheets

SIMPLIFIED INERTIAL BANK ANGLE SENSOR

This application is a continuation-in-part of application, Ser. No. 08/433,796, filed Apr. 27, 1995, now U.S. Pat. No. 5,684,244, which is a continuation-in-part of Ser. No. 08/029,767, filed Mar. 11, 1993, now U.S. Pat. No. 5,426,571 dated Jun. 20, 1995.

BACKGROUND

1. Field of Invention

The Inertial Bank Angle Sensor can be used to determine the angle of bank of a tilting vehicle. Measurement of the bank angle can be useful in optimizing various functions on a motorcycle, such as lighting, power delivery, braking force, camera-mount positioning, turn signal actuation, etc.

2. Discussion of Prior Art

Prior art means for bank angle measurement have used gyroscopic sensors, G-force measurement, vehicle speed combined with steering angle, and radiation reflected from the road surface to determine the attitude of the vehicle. Briefly, gyro sensors are costly and complex, and G-force measurements are subject to gross inaccuracies due to bumps and other terrain variables. Speed and steering angle cannot be used to derive the bank angle because "countersteering", used to initiate a turn, would indicate a bank angle opposite to the true one. On a series of S curves, a bank angle thus derived could be wrong most of the time.

Reflected radiation when used to measure distance from the road surface is generally reliable, but when propagated at an acute angle to the road surface may produce a very weak return signal. In addition, when propagated from the low side of a sharply banked vehicle the radiation may be doubly reflected, once from the road and then from some part of the vehicle itself. Similarly, when propagated from the high side of a banking vehicle, the radiation may be reflected from curbs, fences, and other vehicles, which would severely compromise the accuracy of the measurement.

Another problem with sonar distance measurement is that as the speed of the vehicle increases, the ultrasonic pulse returns to a point behind where the detector would be mounted for optimum signal strength at low speeds.

OBJECTS AND ADVANTAGES

Accordingly, the object of the Simplified Inertial Bank Angle Sensor is to provide a simple, less expensive, and more reliable means of determining the vehicle bank angle.

SUMMARY

A balanced inertial mass, or flywheel, is mounted to a motorcycle, bicycle, or other banking vehicle so that its axis is on or parallel to the longitudinal axis of the vehicle. This flywheel is freewheeling within a housing which is mounted to the vehicle. Attached to the inside of the housing near the flywheel periphery is a scanning device which can measure the direction and degree of rotation of the flywheel relative to the housing, using some sort of reference marks (slots, holes, radial bars, reflective dots, magnetic stripes, etc).

As the vehicle is banked in a turn, the flywheel remains stationary, thus the scanning device reads the bank angle of the flywheel housing relative to the flywheel. This bank angle data may be used to rotate the headlight beam about the longitudinal axis (or beam axis) of the headlight in order to keep the rectangular beam cross-section parallel to the horizon at all angles of bank.

The headlight beam may be rotated by turning the lens, by turning an optical mask, or by rotating the entire headlight assembly, using a motor controlled by a electronic control unit, or ECU, according to the output of the scanning device.

Any flywheel drift caused by friction, vibration, etc. would be minimized in two ways:
(1) by shock-mounting the flywheel housing
(2) by mounting the flywheel on bearings with the smallest possible diameter in order to reduce the torque on the flywheel caused by the ellipsoidal vibratory excursions characteristic of motorcycle engines. This ellipsoidal motion at the bearing journal tends to turn the shaft with a force proportional to shaft diameter and bearing friction.

Although flywheel drift can be minimized, it is still necessary to provide a means for correcting any possible flywheel movement relative to the horizon. This can be done during periods when the vehicle is upright by a rider input which would briefly halt flywheel rotation.

LIST OF REFERENCE NUMERALS

10. Housing
11. Bearing
12. Flywheel
13. Reflective Dots
14. Axle
15. Electro-Optical Scanning Device
16. Brake Pad
17. Solenoid
18. Roller
19. Reflective position indicator strip
20. ECU/Flywheel Assembly
21. Switch
22. O Ring

DESCRIPTION

Figure 1:
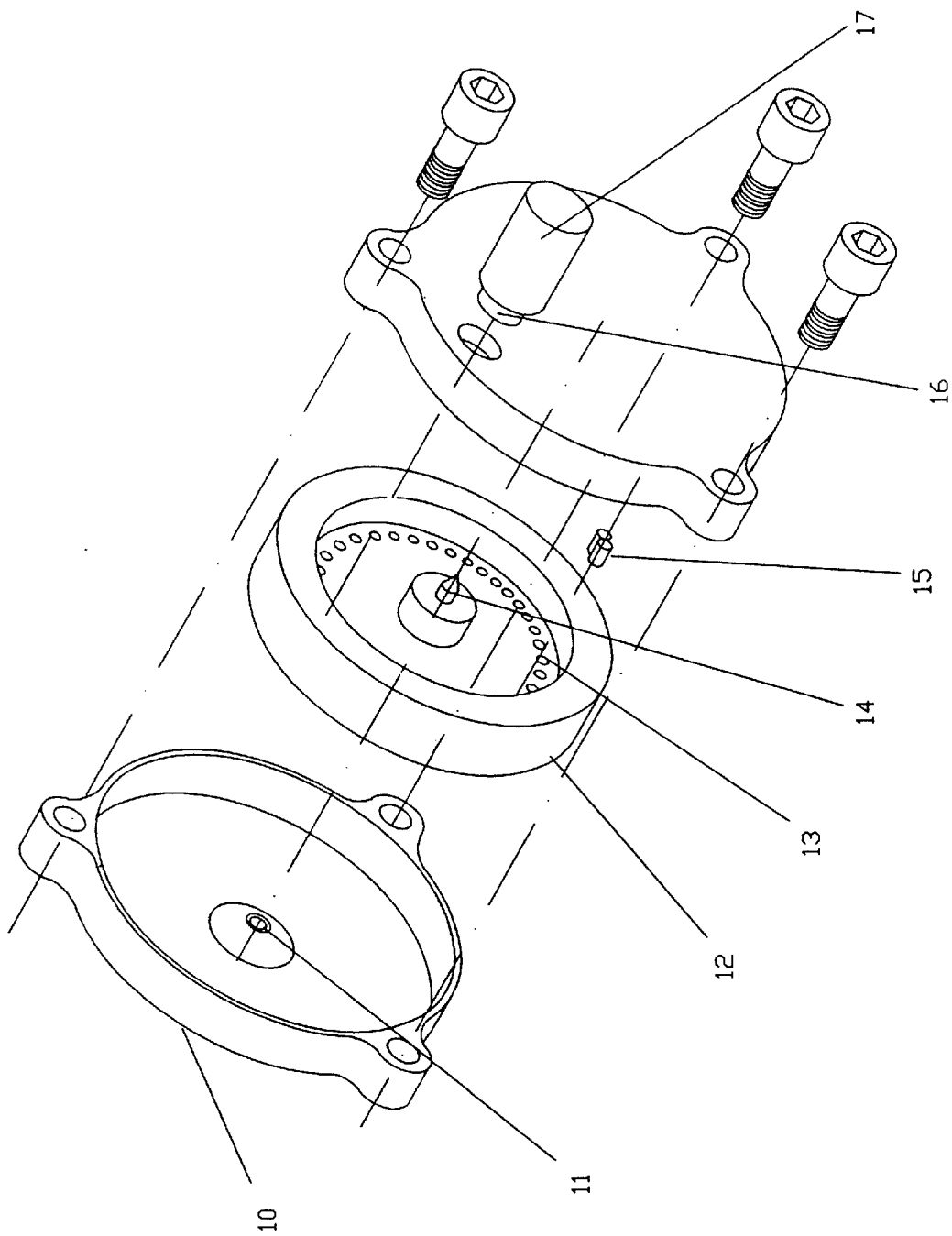
FIG. 1 is an exploded view of the flywheel assembly including the flywheel, housing, brake, and scanner unit.
Figure 4:
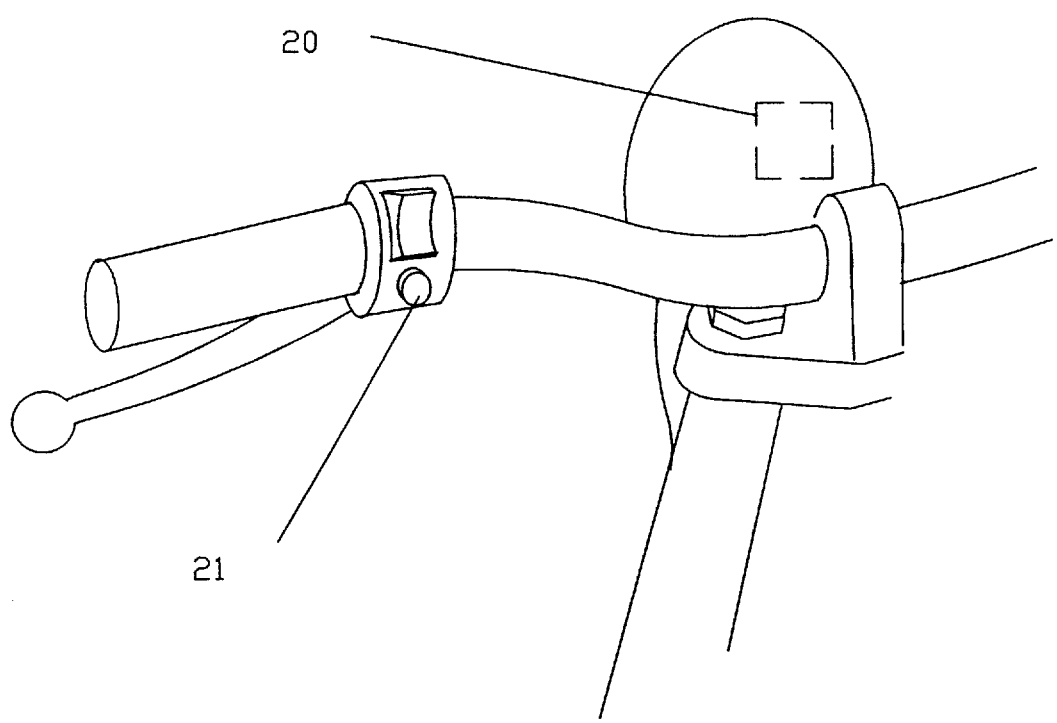
FIG. 4 is a view of a motorcycle showing the location of the operator-actuated switch and the ECU/flywheel unit.

FIG. 1 shows a flywheel (12) free to rotate within a casing or housing (10) which is mounted on a motorcycle with the axis of flywheel rotation parallel to the longitudinal axis of the motorcycle. The flywheel is marked with a series of reflective dots (13) at a predetermined radius. Two electro-optical scanners (15) are mounted to one half of the housing so that light from the scanner emitters reflected from the reflective dots will produce an electrical signal in each scanner detector. The signal from each detector is fed to a electronic control unit, or ECU (20), which may be mounted where convenient as shown in FIG. 4.

A driver-operated switch (21) is connected to a means for stopping any flywheel rotation which may be caused by imbalance, friction and/or vibratory forces on the flywheel. In this embodiment, the stopping means consists of a solenoid-actuated brake pad (16) mounted to the flywheel housing (10) which, when actuated, can contact the flywheel periphery.

Figure 2:
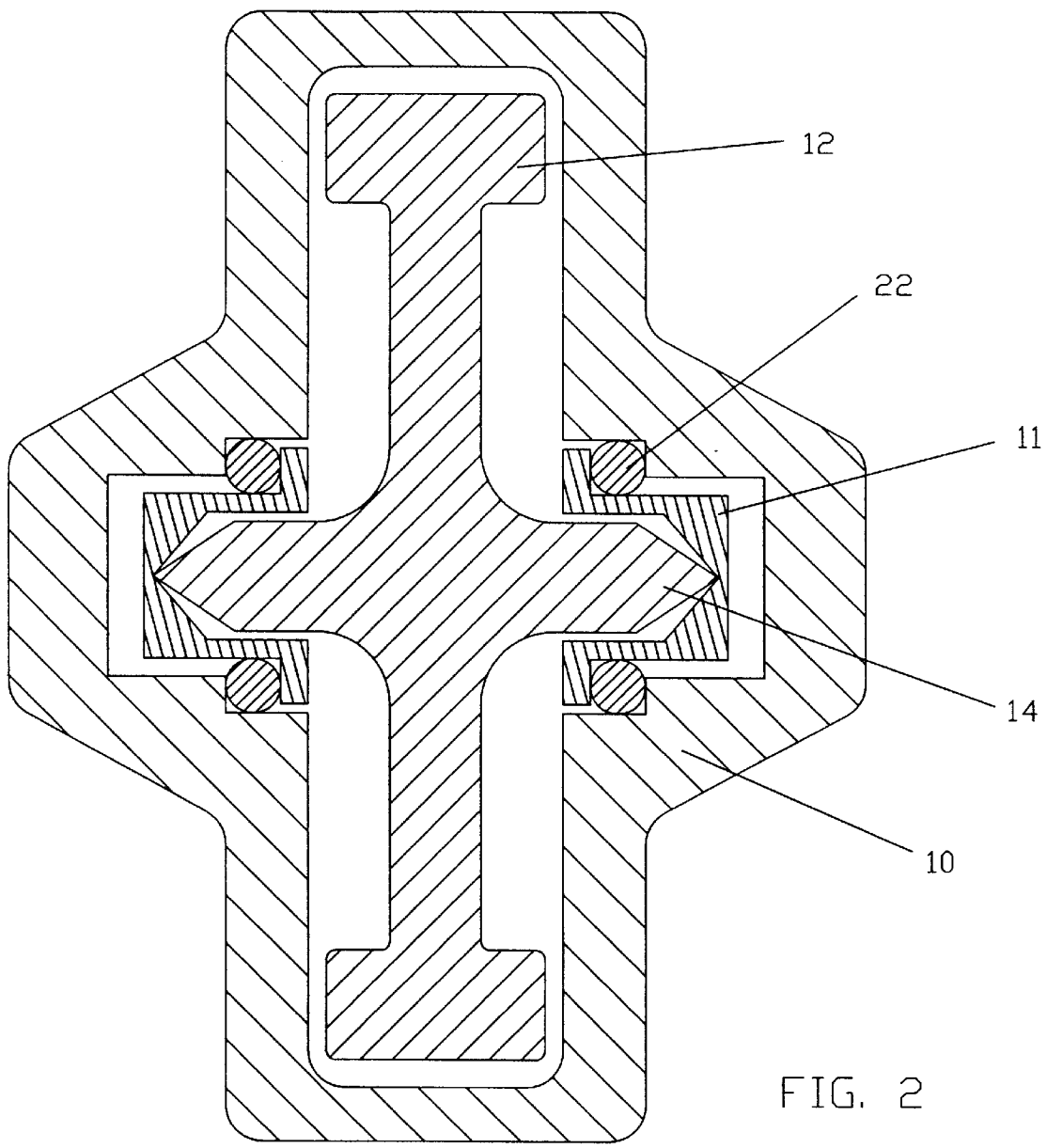
FIG. 2 is cross-section view of the flywheel, showing a bearing system which utilizes pointed axle ends supported by concave conical bearings which are flexibly mounted to the flywheel housing.

FIG. 2 shows a bearing design using conical bearing surfaces to support a flywheel axle (14) with sharply pointed ends. The conical bearings (11) are flexibly mounted to the flywheel housing using O rings (22) in compression.

OPERATION OF INVENTION

As the vehicle banks, the flywheel will tend to maintain its position, and the angle of bank can be ascertained by measuring the direction and degree of rotation between the plane of the motorcycle and the flywheel. Measurement of flywheel rotation is obtained through either an electromagnetic or an electro-optical scanner.

One embodiment, illustrated in FIG. 1 shows a flywheel (12) with a circular array of reflective dots (13) inside a housing (10) which encloses the flywheel and supports the flywheel axle (14). This housing is mounted to the motorcycle where convenient, with the flywheel axis parallel to the longitudinal axis of the motorcycle.

A scanning device (15) is mounted to the flywheel housing in a position so that flywheel movement can be measured by the scanning device.

Because of minute imbalance, friction, and vibration, however, the flywheel position will not necessarily remain constant relative to the horizon, but may tend to drift in one direction or the other, rendering the angle measurement inaccurate. Therefore it is sometimes necessary to correct the angle measurement when the motorcycle is upright or normal to the road surface. The simplest way of doing this is through a driver input.

This can be accomplished by a thumb-switch (21) which forces a housing-mounted, solenoid-actuated brake pad (16) to contact the flywheel surface just long enough to stop any motion of the flywheel relative to the housing. Also, when this switch is closed, the ECU rotates the headlight beam to the central (level) position where the beam cross section is parallel to the horizon. After the flywheel is stopped, and the brake pad retracted, the scanner recommences bank angle measurement from that point.

Figure 3:
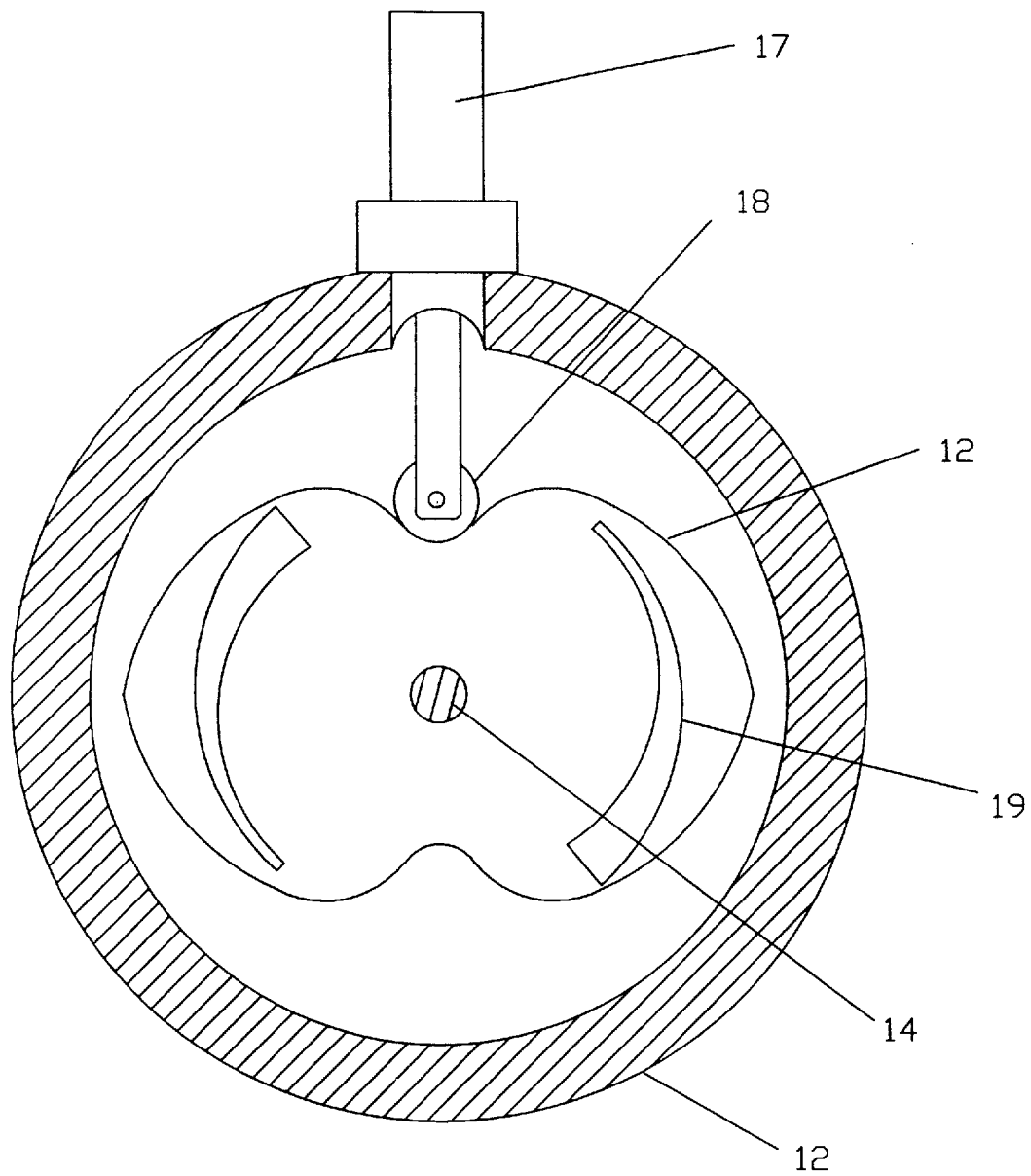
FIG. 3 is a cross-section view of a cam-shaped flywheel assembly which uses a solenoid-operated roller to return the flywheel to its central position.

A second embodiment (see FIG. 3) uses a flywheel (12) with one or more indentations which function as cam ramps when one or more solenoid-operated pins or rollers (18) impinge on it, thereby forcing the flywheel to one of two central, or null, positions, 0 degrees or 180 degrees.

In this application, the range of useful rotation is considerably less than 180 degrees, therefore the flywheel is divided into symmetrical halves in order to make a steeper slope for the cam ramps. The indicator marks which describe flywheel rotation between plus and minus 90 degrees from either null position are identical, so that bank angle measurements are the same if the flywheel is rotated 180 degrees.

Because the flywheel always returns to one of these positions, the scanning method of this embodiment can measure the absolute position of the flywheel directly: a unique pattern of dots, barcode, perforations or other indicator marks will correspond to any given position on each half of the flywheel, so instead of counting, ascertaining direction and remembering, the scanning device merely reads the position of the flywheel at any instant. This can also be accomplished by an analog scanning method such as a variable area reflective strips (19) mounted near the circumference of the flywheel so that the amount of light reflected from either reflective strip to a detector indicates the position of the flywheel within a range of 180 degrees.

In this passive, low speed flywheel function, it is critical to minimize friction. Ball or roller bearings are easily impaired by foreign particles (dust, sand, etc.), and the seals which are normally employed to prevent contamination are themselves a major source of friction.

If bushings were used, it is clear that the least friction would obtain with the smallest possible axle diameter. Since the axle must be thick enough to resist any bending due to shock loads, there will be more friction than desired in normal duty in order to protect the axle against shock loads.

A preferred embodiment uses a bearing design as illustrated in FIG. 2, where the flywheel axle (14) has sharply pointed ends which are supported inside conical bearings (11) which are mounted to the flywheel housing. Elastic O rings (22) are interposed between the bearings and the flywheel housing to accommodate thermal expansion of the axle or housing, and to serve as a shock mounting to protect the axle points from bending. If a radial load on the flywheel is sufficient to flex the O rings, the bearings will tilt until the inner edges of the bearing contact the axle next to the flywheel, thus transmitting the load to the strongest part of the axle.

CONCLUSION, RAMIFICATION AND SCOPE OF INVENTION

The above description should not be construed as a limitation on the scope of the Simplified Inertial Bank Angle Sensor, but rather as an exemplification of some preferred embodiments thereof. Many other variations are possible. Many kinds of scanning methods currently used for reading barcode, for scanning laserdisks, for reading computer floppy disks, etc., are readily adaptable and would offer extremely high-resolution measurement.

The bearing system of pointed axle ends supported by conical bearings could be shock-mounted by allowing the axle to flex within rigidly mounted bearings instead of allowing the bearings to flex as in the preferred embodiment described above.

The flywheel could be returned to the central position elecromagnetically. The thumb-switch could be combined with the turn signal switch button and could also have a function which locks the flywheel (and therefore the headlight) in the centered (or null) position where the rectangular beam pattern cross-section is at right angles to the plane of the motorcycle. This would work well in daylight when the headlight is used only to make the vehicle more noticeable to other traffic.

I claim:

1. A device for measuring the bank angle of banking vehicles comprising:
   (a) a flywheel free to turn on an axis parallel to the direction of movement of said vehicle
   (b) measuring means to measure the rotation of said flywheel
   (c) operator input means to stop flywheel rotation as needed when said vehicle is in an upright position
   (d) electronic control means to derive a bank angle output from data from said rotation measuring means.

2. The bank angle sensor of claim 1 wherein the rotation of said flywheel relative to said vehicle is measured by electromagnetic means.

3. The bank angle sensor of claim 1 wherein the rotation of said flywheel relative to said vehicle is measured by electro-optical means.

4. The bank angle sensor of claim 1 whereby flywheel rotation is stopped by mechanical friction.

5. The bank angle sensor of claim 1 wherein flywheel rotation is stopped by electromagnetic means.

6. The bank angle sensor of claim 1 wherein said flywheel has a cam profile whereby a cam follower forces the flywheel to return to a central position.

7. The bank angle sensor of claim 1 wherein said electronic control means reset the indicated bank angle to the central, or null, bank angle position when an operator input switch is triggered.

8. The bank angle sensor of claim 1 wherein the flywheel axle ends are tapered to points and supported by concave conical bearings.

9. The bank angle sensor of claim 8 wherein said conical bearings are flexibly mounted to protect the axle end points from shock damage.

10. The bank angle sensor of claim 8 wherein the axle can flex sufficiently to protect said axle end points from shock damage.

11. A device for rotating the headlight beam of a banking vehicle, comprising:

(a) a flywheel free to turn on a fore-aft axis (b) scanning means to measure the degree and direction of rotation of said flywheel relative to said vehicle (c) electronic control means to rotate the vehicle headlight beam about a fore-aft, or beam, axis so that the degree and direction of rotation of said headlight beam corresponds to the degree and direction of said flywheel rotation relative to said vehicle (d) operator input means to stop any flywheel movement and simultaneously return the headlight beam to the center of its rotation range whereby the rectangular cross-section of the beam pattern is positioned parallel to the horizon with the vehicle upright.

12. The device of claim 11 wherein said flywheel may be stopped in any position, and wherein electronic control means, after returning said headlight beam to the center of its rotation range, will recommence measurement of flywheel movement from that flywheel position.

13. The device of claim 11 wherein said flywheel is returned to a central, or null, position by said driver input, enabling flywheel position to be read directly by reading a pattern of marks on said flywheel which are unique for any given flywheel position.

14. The device of claim 13 where said flywheel is returned to said null position by electromagnetic means.

15. The device of claim 13 wherein said flywheel is returned to said null position by mechanical means.

16. The device of claim 11 wherein said flywheel is supported at conical axle ends by concave conical bearings having a substantially greater included angle than said axle ends.

17. The device of claim 16 further including elastic means whereby excessive radial loads on said flywheel cause said axle to contact the inner edges of said conical bearings, thereby preventing damage to the points of said axle ends.

18. The device of claim 11 further including a switch which can be used to stop headlight beam rotation and lock said rotatable beam in the central, or null bank angle position.

* * * * *